(12) United States Patent
Saito

(10) Patent No.: US 11,780,622 B2
(45) Date of Patent: Oct. 10, 2023

(54) TAPING APPARATUS AND TAPING METHOD

(71) Applicant: Taiyo Yuden Co., Ltd., Tokyo (JP)

(72) Inventor: Koji Saito, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 17/804,677

(22) Filed: May 31, 2022

(65) Prior Publication Data

US 2022/0289412 A1 Sep. 15, 2022

Related U.S. Application Data

(62) Division of application No. 16/444,269, filed on Jun. 18, 2019, now Pat. No. 11,377,242.

(30) Foreign Application Priority Data

Jun. 21, 2018 (JP) .................................. 2018-117602

(51) Int. Cl.
*B65B 15/04* (2006.01)
*B65B 35/10* (2006.01)
*B65B 57/14* (2006.01)

(52) U.S. Cl.
CPC .............. *B65B 15/04* (2013.01); *B65B 35/10* (2013.01); *B65B 57/14* (2013.01); *B65G 2201/02* (2013.01)

(58) Field of Classification Search
None
See application file for complete search history.

(56) References Cited

U.S. PATENT DOCUMENTS

| 6,333,483 B1 * | 12/2001 | Ueno | B23K 1/0056 |
| | | | 219/121.64 |
| 6,634,159 B1 * | 10/2003 | Muto | B65B 9/045 |
| | | | 53/591 |
| 2003/0136087 A1 * | 7/2003 | Lehner | H01L 21/67126 |
| | | | 53/559 |

(Continued)

FOREIGN PATENT DOCUMENTS

| JP | 2000289709 | 10/2000 |
| JP | 2000289709 A * | 10/2000 |

(Continued)

*Primary Examiner* — Tanzim Imam
(74) *Attorney, Agent, or Firm* — CHIP LAW GROUP

(57) ABSTRACT

Disclosed is a taping apparatus including: a tray storage device supplying a designated one of plural kinds of trays on which respective different kinds of parts are scattered; a carrier tape feed device intermittently moving a designated one of plural kinds of carrier tapes which correspond to the respective different kinds of parts; a first camera capturing an image of the scattered parts on the designated tray; a first image recognizing device recognizing respective centers of the scattered parts; a rotary head individually sucking the scattered parts to rotatable suction nozzles; a second camera capturing an image of the parts sucked to the suction nozzles; a second image recognizing device recognizing respective orientations of the sucked parts; and a part inserting device adjusting the orientations of the sucked parts to orientations insertable into part storage recesses defined in the designated carrier tape and then inserting the parts into the part storage recesses, respectively.

5 Claims, 13 Drawing Sheets

(56) References Cited

U.S. PATENT DOCUMENTS

2004/0168774 A1* 9/2004 Nakagawa .............. B65B 15/04
                                                                                          156/556
2013/0321981 A1* 12/2013 Ahn ...................... H01G 2/065
                                                                                          361/728

FOREIGN PATENT DOCUMENTS

| | | | | |
|---|---|---|---|---|
| JP | 2002-029505 A | 1/2002 | | |
| JP | 2006-168754 A | 6/2006 | | |
| JP | 2006264749 | 10/2006 | | |
| JP | 2006264749 A * | 10/2006 | | |
| JP | 2010-070271 A | 4/2010 | | |
| JP | 5544461 B1 * | 7/2014 | ......... | H05K 13/0413 |
| JP | 5544461 | 1/2017 | | |
| TW | 201625474 | 7/2016 | | |
| TW | 201625474 A * | 7/2016 | ............. | B65B 15/04 |
| WO | 2014087492 | 6/2014 | | |
| WO | WO-2014087485 A1 * | 6/2014 | ............. | B65B 15/04 |
| WO | WO-2014087492 A1 * | 6/2014 | ............. | B65B 15/04 |
| WO | 2015097865 | 7/2015 | | |
| WO | WO-2015097865 A1 * | 7/2015 | ........... | H05K 13/021 |
| WO | 2014087485 | 1/2017 | | |

* cited by examiner

TAPING APPARATUS AND TAPING METHOD

CROSS REFERENCE TO RELATED APPLICATION

This application is a divisional application of U.S. patent application Ser. No. 16/444,269, filed Jun. 18, 2019, which is based upon and claims benefit of priority from Japanese Patent Application No. 2018-117602, filed on Jun. 21, 2018, the entire contents of which are incorporated herein by reference.

BACKGROUND

The present disclosure relates to a taping apparatus and a taping method for manufacturing a part storage tape.

A part storage tape is manufactured by inserting parts into respective part storage recesses in a carrier tape and applying a cover tape to the carrier tape to close the part storage recesses. The part storage tape is generally supplied in the form of a coil on a reel to a user such as a device manufacturer or the like. Providing the parts on the part storage tape are small, the total number of the parts on the reel may be several tens of thousands.

Some users demand fewer-parts reels, i.e., reels that store fewer parts such as several hundred parts or carry shorter part storage tapes for the reason that they manufacture fewer devices or they need to make pre-production assessment, for example. However, even if such fewer-parts reels are to be supplied, part storage tapes that are wound on the fewer-parts reels are manufactured in the same manner as part storage tapes for more-parts reels, i.e., part storage tapes that store more parts or that are longer.

In other words, when fewer-parts reels are to be manufactured, it is necessary to prepare taping apparatus (see, for example, Japanese Patent Laid-Open Nos. 2002-029505, 2006-168754, and 2010-070271) that are similar to those used for manufacturing more-parts reels. Consequently, the total cost including time and expenses required to prepare those taping apparatus may not balance the value received from providing the manufactured fewer-parts reels, possibly resulting in losses.

SUMMARY

The present disclosure has been made in view of the above circumstances, and provides a taping apparatus and a taping method for minimizing losses even when fewer-parts reels, i.e., reels that store fewer parts or carry shorter part storage tapes, are demanded by the user.

According to an embodiment of the present disclosure, there is provided a taping apparatus including a tray storage device configured to supply a designated one of a plurality of kinds of trays on which respective different kinds of parts are scattered; a carrier tape feed device configured to intermittently move a designated one of a plurality of kinds of carrier tapes which correspond to the respective different kinds of parts; a first camera configured to capture an image of the scattered parts on the designated tray supplied from the tray storage device; a first image recognizing device configured to recognize respective centers of the scattered parts based on the image thereof captured by the first camera; a rotary head configured to individually suck the scattered parts to a plurality of rotatable suction nozzles based on the respective centers of the scattered parts recognized by the first image recognizing device; a second camera configured to capture an image of the parts sucked to the suction nozzles of the rotary head; a second image recognizing device configured to recognize respective orientations of the sucked parts based on the image thereof captured by the second camera; and a part inserting device configured to adjust the orientations of the sucked parts to orientations insertable into part storage recesses defined in the designated carrier tape by rotating the suction nozzles, based on the respective orientations of the sucked parts recognized by the second image recognizing device, and then insert the parts into the part storage recesses, respectively.

According to another embodiment of the present disclosure, there is also provided a taping method including: supplying a designated one of a plurality of kinds of trays on which respective different kinds of parts are scattered, using a tray storage device; capturing an image of the scattered parts on the designated tray supplied from the tray storage device, using a first camera; recognizing respective centers of the scattered parts based on the image thereof captured by the first camera, using a first image recognizing device; individually sucking the scattered parts to a plurality of rotatable suction nozzles based on the respective centers of the scattered parts recognized by the first image recognizing device, using a rotary head; capturing an image of the parts sucked to the suction nozzles of the rotary head, using a second camera; recognizing respective orientations of the sucked parts based on the image thereof captured by the second camera, using a second image recognizing device; intermittently moving a designated one of a plurality of kinds of carrier tapes which correspond to the respective different kinds of parts, using a carrier tape feed device; and adjusting the orientations of the sucked parts to orientations insertable into part storage recesses defined in the designated carrier tape by rotating the suction nozzles, based on the respective orientations of the sucked parts recognized by the second image recognizing device, and then inserting the parts into the part storage recesses, respectively, using a part inserting device.

The taping apparatus and the taping method according to the present disclosure are able to minimize losses even when fewer-parts reels, i.e., reels that store fewer parts or carry shorter part storage tapes, are demanded by the user.

The above and other objects, features, and advantages of the present disclosure will become more apparent from the following description when taken in conjunction with the accompanying drawings.

DETAILED DESCRIPTION OF THE PREFERRED EMBODIMENTS

First, examples of carrier tapes and examples of parts that can be inserted into the carrier tapes will be described below with reference to FIGS. 1A, 1B and 1C. The carrier tapes and the parts to be described below are illustrated by way of example only, and should not be taken as limiting the kinds of carrier tapes and parts that can be used in a taping apparatus to be described later.

Figure 1A:
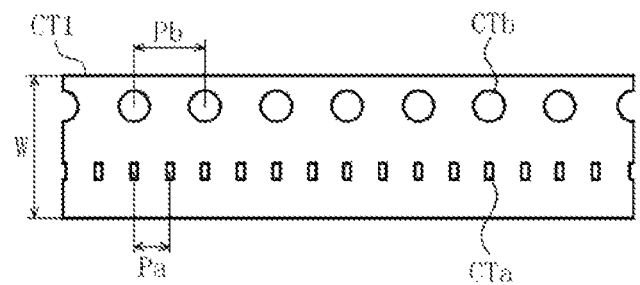
FIGS. 1A, 1B and 1C are fragmentary plan views of examples of carrier tapes.
Figure 1B:
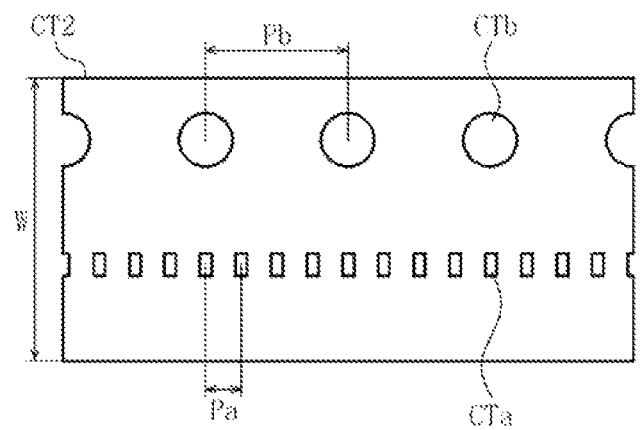
Figure 1C:
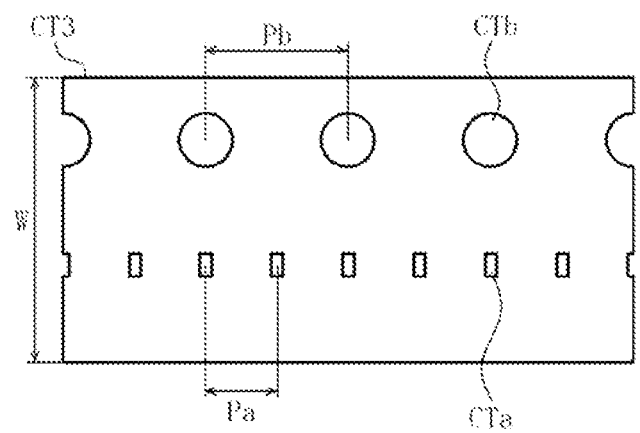

FIGS. 1A, 1B and 1C illustrate three kinds of carrier tapes CT1, CT2, and CT3, respectively. In FIGS. 1A, 1B and 1C, W represents a tape width, CTa represents part storage recesses, each in the form of a rectangular parallelepiped, defined in the carrier tapes CT1, CT2, and CT3, CTb represents tape feed holes, each of a circular shape, defined in the carrier tapes CT1, CT2, and CT3, Pa represents a pitch between the part storage recesses CTa, and Pb represents a pitch between the tape feed holes CTb. The carrier tape CT2 is different from the carrier tape CT1 in that the tape width W of the carrier tape CT2 is twice the tape width W of the carrier tape CT1, the pitch Pb of the carrier tape CT2 is twice the pitch Pb of the carrier tape CT1, and the part storage recesses CTa and the tape feed holes CTb of the carrier tape CT2 are different in size from the part storage recesses CTa and the tape feed holes CTb of the carrier tape CT1. The carrier tape CT3 is different from the carrier tape CT2 in that the pitch Pa of the carrier tape CT3 is twice the pitch Pa of the carrier tape CT2 and the part storage recesses CTa of the carrier tape CT3 are different in size from the part storage recesses CTa of the carrier tape CT2.

Examples of specific numerical values will be described below. The tape width W of the carrier tape CT1 is 4 mm, the pitch Pa thereof is 1 mm, and the pitch Pb thereof is 2 mm. Each of the part storage recesses CTa of the carrier tape CT1 is capable of storing therein a part C1 (see FIG. 2) in the form of a rectangular parallelepiped that has a length of 0.4 mm, a width of 0.2 mm, and a height of 0.2 mm, each representing a standard dimension without tolerances. The tape width W of the carrier tape CT2 is 8 mm, the pitch Pa thereof is 1 mm, and the pitch Pb thereof is 4 mm. Each of the part storage recesses CTa of the carrier tape CT2 is capable of storing therein a part C2 (see FIG. 2) in the form of a rectangular parallelepiped that has a length of 0.6 mm, a width of 0.3 mm, and a height of 0.3 mm, each representing a standard dimension without tolerances. The tape width W of the carrier tape CT3 is 8 mm, the pitch Pa thereof is 2 mm, and the pitch Pb thereof is 4 mm. Each of the part storage recesses CTa of the carrier tape CT3 is capable of storing therein a part C3 (see FIG. 2) in the form of a rectangular parallelepiped that has a length of 0.6 mm, a width of 0.3 mm, and a height of 0.15 mm, each representing a standard dimension without tolerances. The parts C1 through C3 are mainly electronic parts each in the form of a rectangular parallelepiped, such as capacitor elements, varistor elements, inductor elements, and so on, though they may be parts other than electronic parts insofar as they are in the form of a rectangular parallelepiped or they may be parts not in the form of a rectangular parallelepiped insofar as they need orientation control for insertion into the part storage recesses CTa.

Figure 2:
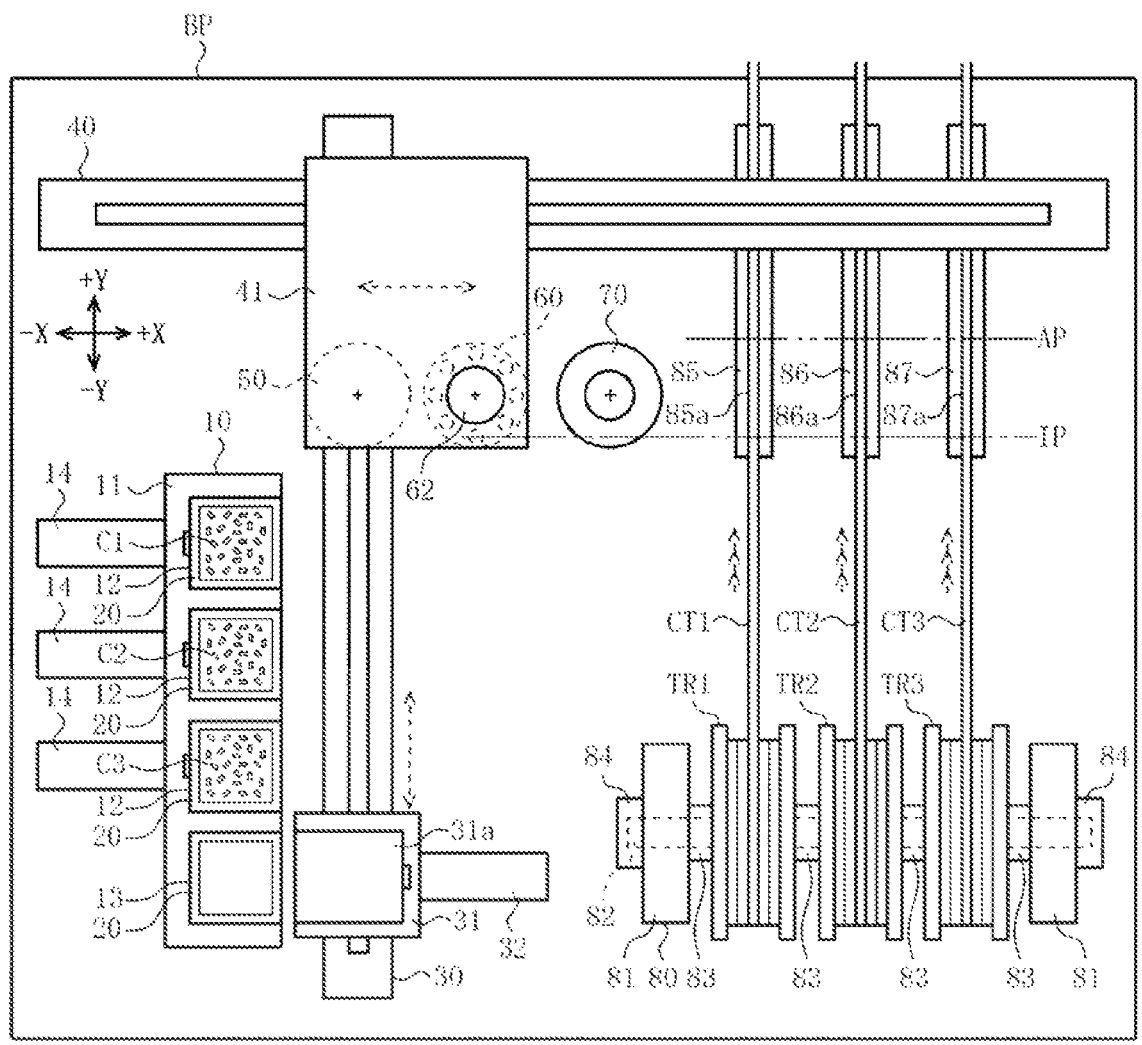
FIG. 2 is a plan view of a taping apparatus according to an embodiment of the present disclosure.

A taping apparatus according to an embodiment of the present disclosure will be described below with reference to FIGS. 2, 3A, 3B, 3C, 4, 5A, 5B, 5C and 5D. FIG. 2 illustrates the carrier tapes CT1 through CT3 and the parts C1 through C3 described above for illustrative purposes. However, the illustrated carrier tapes and parts should not be taken as limiting the kinds of carrier tapes and parts that can be used in a taping apparatus according to the present disclosure.

As illustrated in FIG. 2, the taping apparatus includes a base plate BP, a tray storage device 10, a plurality of trays 20, a tray delivery device 30, a rotary head delivery device 40, a first camera 50, a rotary head 60, a second camera 70, and a carrier tape feed device 80. The taping apparatus also includes a cover tape applying device, not illustrated.

Figure 3A:
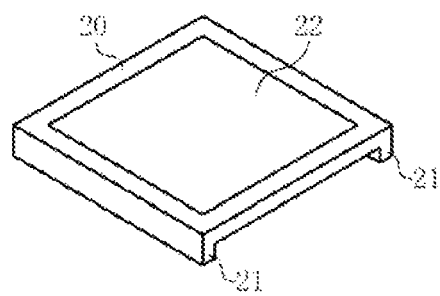
FIG. 3A is a perspective view of a tray illustrated in FIG. 2.
Figure 3B:
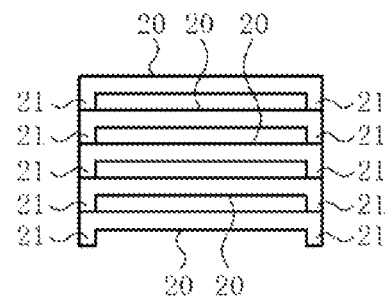
FIG. 3B is a side elevational view of a stack of trays illustrated in FIG. 3A.

As illustrated in FIG. 3A, each of the trays 20 is of a rectangular shape as viewed in plan. The tray 20 has a pair of legs 21 disposed respectively on the opposite edges of a lower surface thereof and a soft mat 22 made of synthetic rubber, synthetic resin, or the like and disposed on an upper surface thereof except its peripheral edges. As illustrated in FIG. 3B, the trays 20 can be vertically arrayed in a vertical stack where the legs 21 of each tray 20, except the lowest tray 20, are placed on the lower tray 20, leaving a space over the mat 22 of the lower tray 20.

The taping apparatus illustrated in FIG. 2 is designed to handle three kinds of parts C1 through C3. Therefore, the taping apparatus includes three kinds of trays 20 prepared in advance that carry the different kinds of parts C1 through C3 thereon. Specifically, a number of parts C1 are scattered on each of the stacked trays 20 of one of the three kinds. Similarly, a number of parts C2 are scattered on each of the stacked trays 20 of another one of the three kinds, and a number of parts C3 are scattered on each of the stacked trays 20 of the third kind. The parts C1 through C3 that are scattered on the trays 20 are spread randomly over the mats 22 without an overlap. Since the mats 22 are soft, each of the parts C1 through C3 scattered thereon are prevented from sliding around due to contact with the mats 22 even when the trays 20 are moved.

The tray storage device 10 includes a main body 11 disposed on the base plate BP and having a rectangular shape as viewed in plan, three tray storage sections 12 for storing the respective three kinds of trays 20 in vertical stacks, and a single tray retrieval section 13 for retrieving used trays 20 in a vertical stack. The tray storage sections 12 and the tray retrieval section 13 are arrayed in Y directions. Each of the tray storage sections 12 and the tray retrieval section 13 has a surface facing a first table 31, to be described later, the surface being open preferably in only an upper portion thereof.

Figure 3C:
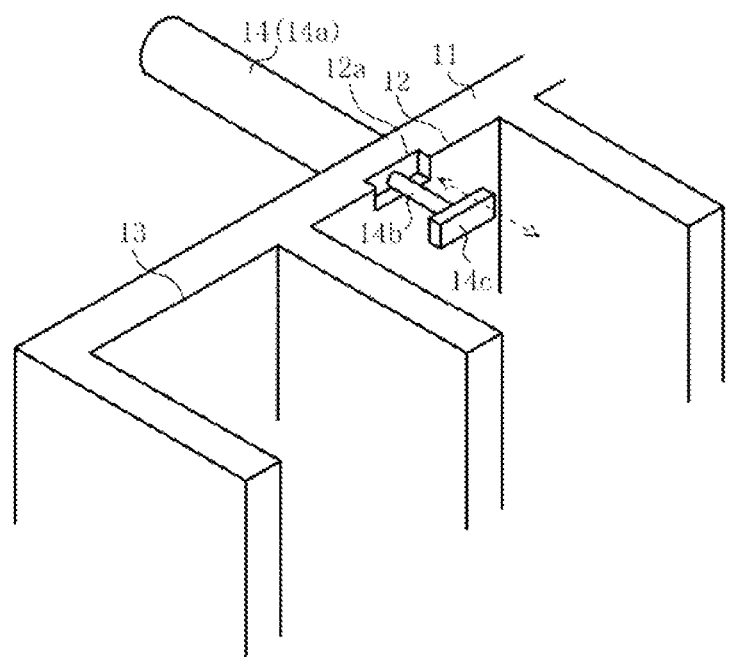
FIG. 3C is a fragmentary perspective view of a tray storage device illustrated in FIG. 2.

Each of the tray storage sections 12 includes a tray supply mechanism 14 for pushing the uppermost tray 20 on the stack toward the first table 31. As illustrated in FIG. 3C, the tray supply mechanism 14 includes an air cylinder 14a and a presser 14c mounted on a rod 14b of the air cylinder 14a. When the air cylinder 14a is actuated, its rod 14b pushes the presser 14c in a +X direction out of a cavity 12a defined in the main body 11 to push the uppermost tray 20 on the stack in the tray storage section 12 toward the first table 31 and supply the tray 20 onto the first table 31. Each of the tray storage sections 12 has a mechanism, not illustrated, for lifting a second tray 20 on the stack to the uppermost position after the uppermost tray 20 has been supplied, e.g., a lifting and lowering mechanism actuatable by an electric motor.

The tray retrieval section 13 may be a space for housing therein a vertical stack of used trays 20. The tray retrieval section 13 may include a mechanism for lowering the vertical stack of used trays 20 by a distance corresponding to one tray after it has retrieved a used tray 20, e.g., a lifting and lowering mechanism actuatable by an electric motor. The tray storage device 10 may include as many tray retrieval sections 13 as the number of the tray storage sections 12, i.e., three tray retrieval sections 13, for retrieving the respective kinds of trays 20 that have been used.

The tray delivery device 30, which is disposed on the base plate BP, includes a linear drive mechanism, not illustrated, actuatable by an electric motor 30a (see FIG. 6) for moving a movable member, not illustrated, in the Y directions. The first table 31 is fixed to the movable member.

The first table 31 has a tray housing recess 31a defined in an upper surface thereof for housing a tray 20 therein. The tray housing recess 31a is open through a side of the first table 31 that faces the tray storage sections 12 and the tray retrieval section 13. The tray housing recess 31a in the first table 31 is disposed in a vertical position aligned with the vertical position of the uppermost tray 20 stored in each of the tray storage sections 12. Therefore, the tray housing recess 31a can receive and house the uppermost tray 20 that is supplied from either one of the tray storage sections 12 of the tray storage device 10.

Figure 4:
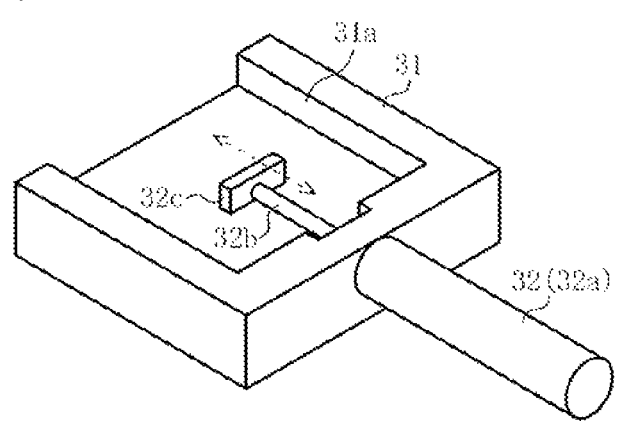
FIG. 4 is a perspective view of a first table illustrated in FIG. 2.

The first table 31 also has a tray retrieval mechanism 32 for pushing the tray 20 housed in the tray housing recess 31a toward the tray retrieval section 13. As illustrated in FIG. 4, the tray retrieval mechanism 32 includes an air cylinder 32a and a presser 32c mounted on a rod 32b of the air cylinder 32a. When the air cylinder 32a is actuated, its rod 32b pushes the presser 32c in a −X direction out of a cavity 31b defined in the first table 31 to push the tray 20 housed in the tray housing recess 31a toward the tray retrieval section 13, which retrieves the tray 20.

The rotary head delivery device 40, which is disposed on the base plate BP, includes a linear drive mechanism, not illustrated, actuatable by an electric motor 40a (see FIG. 6) for moving a movable member, not illustrated, in X directions. The rotary head delivery device 40 also includes a second table 41 that is fixed to the movable member. The first camera 50 and the rotary head 60 are fixed to a lower surface of the second table 41. The first camera 50 and the rotary head 60 are arrayed in the Y directions and directed downwardly. The rotary head delivery device 40 is disposed in a vertical position higher than the vertical position of the tray delivery device 30 so that the first camera 50 can capture images of one at a time of the kinds of scattered parts C1 through C3 and the rotary head 60 can suck one at a time of the kinds of parts C1 through C3 without fail.

When the tray 20 that is housed in the tray housing recess 31a in the first table 31 is moved in the +Y direction to a position below the first camera 50, the first camera 50 captures an image of one of the kinds of scattered parts C1 through C3 on the mat 22 of the tray 20.

Figure 5A:
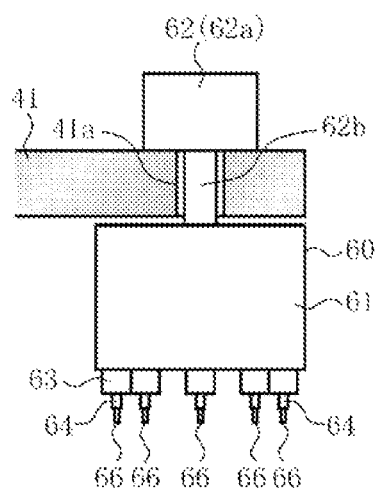
FIG. 5A is a side elevational view of a rotary head illustrated in FIG. 2.

As illustrated in FIG. 5A, the rotary head 60 includes a hollow cylindrical head body 61 rotatable about its own vertical central axis by a head rotating mechanism 62 mounted on the second table 41. The head rotating mechanism 62 includes an electric motor 62a having a drive shaft 41a extending through a hole 41a defined in the second table 41 and coupled to an upper surface of the head body 61.

Figure 5B:
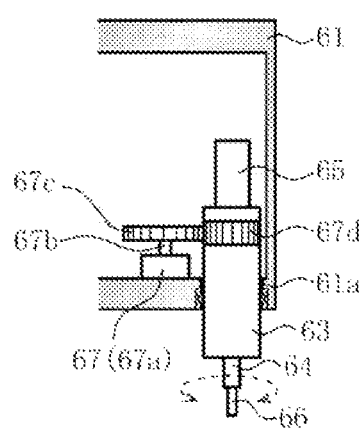
FIG. 5B is an enlarged fragmentary cross-sectional view of the rotary head illustrated in FIG. 5A.
Figure 5C:
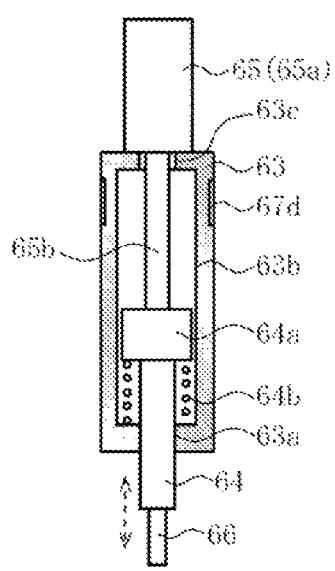
FIG. 5C is an enlarged fragmentary cross-sectional view of the rotary head illustrated in FIG. 5B.
Figure 5D:
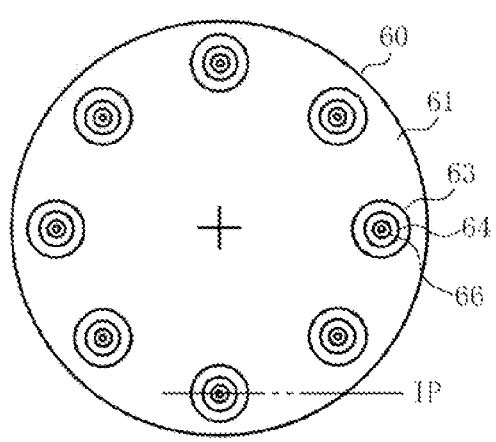
FIG. 5D is an enlarged bottom view of the rotary head illustrated in FIG. 5A.

As illustrated in FIGS. 5B and 5D, the head body 61 has a total of eight holes 61a defined in a bottom wall thereof at equal angular intervals around the vertical central axis of the head body 61. The rotary head 60 includes a total of eight nozzle holders 63 rotatably disposed respectively in the holes 61a. The nozzle holders 63 have respective lower portions protruding downwardly from a lower surface of the bottom wall of the head body 61. The nozzle holders 63 have respective vertical central axes spaced equal distances from the vertical central axis of the head body 61. The nozzle holders 63 are arranged at equally spaced angular intervals, i.e., 45° in FIG. 5D, around the vertical central axis of the head body 61.

As illustrated in FIG. 5C, each of the nozzle holders 63 has a hole 63a defined in a bottom wall thereof, and a hollow cylindrical nozzle support 64 is vertically movably disposed in the hole 63a. The nozzle support 64 has a lower portion protruding downwardly from a lower surface of the bottom wall of the nozzle holder 63. The nozzle support 64 includes a rotation stop 64a in the shape of a polygonal prism, preferably a quadrangular prism or a hexagonal prism, on an upper portion thereof. The rotation stop 64a is vertically movably and nonrotatably disposed in a space 63b in the shape of a polygonal prism, preferably a quadrangular prism or a hexagonal prism, defined in the nozzle holder 63, and is normally urged to move upwardly by a compression spring 64b.

As illustrated in FIG. 5C, each of the nozzle holders 63 supports on its upper end a nozzle lifting and lowering mechanism 65 for lifting and lowering the nozzle support 64. The nozzle lifting and lowering mechanism 65 includes an air cylinder 65a having a rod 65b extending into the nozzle holder 63 and held in contact with an upper surface of the nozzle support 64. The nozzle support 64 is lowered by downward movement of the rod 65*b* of the air cylinder 65*a* when the air cylinder 65*a* is actuated, and is lifted by upward movement of the rod 65*b* of the air cylinder 65*a* when the air cylinder 65*a* is actuated and also by the biasing force from the compression spring 64*b*.

As illustrated in FIGS. 5A, 5B, 5C and 5D, suction nozzles 66, each in the shape of a cylindrical or a quadrangular prism, used for sucking parts C1 through C3 are integrally combined with respective lower ends of the nozzle supports 64. The nozzle supports 64 and the suction nozzles 66 have suction holes, not illustrated, defined therein that extend to respective lower surfaces of the suction nozzle 66. Air tubes, not illustrated, for transmitting a negative or positive pressure therethrough are connected respectively to the suction holes.

As illustrated in FIG. 5B, nozzle rotating mechanisms 67 for rotating the nozzle holders 63, respectively, are disposed in the head body 61. Each of the nozzle rotating mechanisms 67 includes an electric motor 67*a* mounted on the bottom wall of the head body 61, a gear 67*c* fixed to a drive shaft 67*b* of the electric motor 67*a*, and a series of gear teeth 67*d* disposed on an upper outer surface of the nozzle holder 63 and held in mesh with the gear 67*c*. When the electric motor 67*a* is energized, the drive shaft 67*b* is rotated about its own axis, causing the gear 67*c* and the gear teeth 67*d* to rotate the nozzle holder 63 about its vertical central axis.

Therefore, the head body 61 of the rotary head 60 is rotatable about its vertical central axis, and the nozzles 66 thereof are vertically movable and rotatable about their vertical central axes.

The second camera 70 is disposed on the base plate BP at a position aligned with the first camera 50 and the rotary head 60 along the X directions parallel to the rotary head delivery device 40. When the rotary head 60 on the second table 41 is moved in the +X direction to a position above the second camera 70, the second camera 70 captures an image of one of the kinds of parts C1 through C3 that are sucked by the eight suction nozzles 66 of the rotary head 60.

As illustrated in FIG. 2, the carrier tape feed device 80 has a pair of supports 81 disposed on the base plate BP and a shaft 82 supported on the supports 81. Three supply reels TR1, TR2, and TR3 are rotatably and removably mounted on the shaft 82 with a spacer ring 83 interposed therebetween. Caps 84 are mounted respectively on both ends of the shaft 82 for preventing the shaft 82 from being pulled out of the supports 81. Of the three supply reels TR1 through TR3, the supply reel TR1 carries the carrier tape CT1 wound thereon, the supply reel TR2 carries the carrier tape CT2 wound thereon, and the supply reel TR3 carries the carrier tape CT3 wound thereon.

As illustrated in FIG. 2, the carrier tape feed device 80 also has three tape guides 85, 86, and 87 for individually guiding the carrier tapes CT1 through CT3, respectively, unreeled from the supply reels TR1 through TR3. The tape guides 85 through 87 have respective guide grooves 85*a*, 86*a*, and 87*a* defined therein whose widths are commensurate with the tape widths W of the carrier tapes CT1 through CT3. Two two-dot-and-dash lines that extend in the X directions across the tape guides 85 through 87 represent a part inserting position IP and a cover tape applying position AP, respectively. As can be seen from FIGS. 2 and 5D, an extension of the two-dot-and-dash line that represents the part inserting position IP passes through a center of one of the eight suction nozzles 66 of the rotary head 60, i.e., the lowermost suction nozzle 66 in FIG. 5D.

The carrier tape feed device 80 further has three take-up reels, not illustrated, for winding carrier tapes CT1 through CT3, i.e., part storage tapes, after the parts C1 through C3 have been inserted in the part storage recesses CTa and cover tapes, not illustrated, have been applied thereto, and three electric motors 105 (see FIG. 6) for intermittently rotating the take-up reels individually about their own axes.

The cover tape applying device, not illustrated, applies cover tapes individually to the carrier tapes CT1 through CT3 after the parts C1 through C3 have been inserted in the part storage recesses CTa, in the cover tape applying position AP, thereby closing the part storage recesses CTa. The cover tape applying device has heating units, not illustrated, with built-in heaters for heating the carrier tapes CT1 through CT3, respectively, solenoids 106 (see FIG. 6) for lifting and lowering the heating units, and three cover tape supply reels, not illustrated, for supplying the cover tapes to be applied respectively to the carrier tapes CT1 through CT3.

A control system of the taping apparatus illustrated in FIG. 2 will be described below with reference to FIG. 6.

Figure 6:
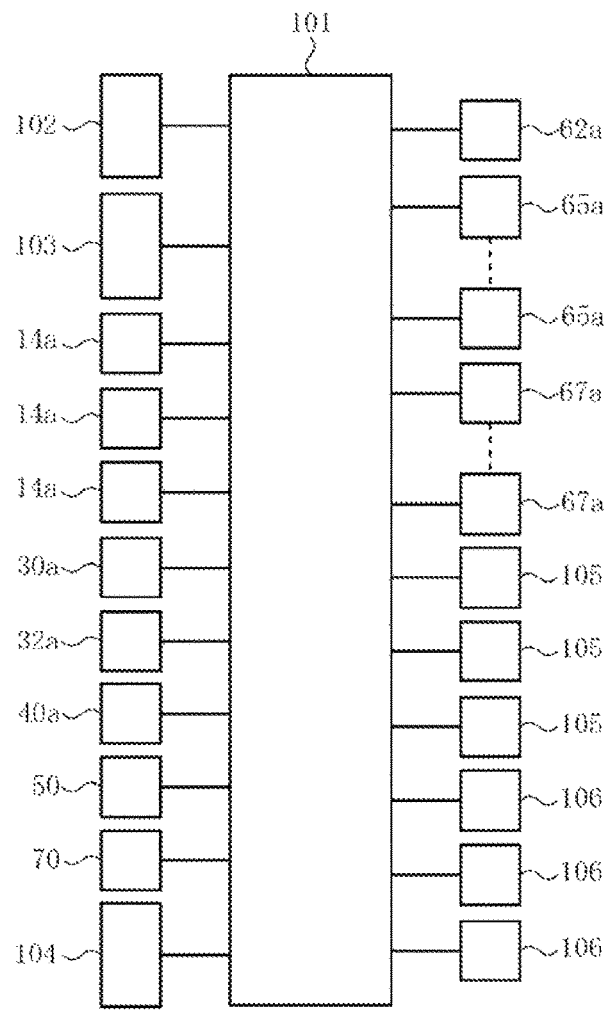
FIG. 6 is a block diagram of a control system of the taping apparatus illustrated in FIG. 2.

The control system illustrated in FIG. 6 includes a main controller 101, an input unit 102, a display unit 103, the air cylinder 14*a* of the tray supply mechanism 14 referred to above, the electric motor 30*a* of the tray delivery device 30 referred to above, the air cylinder 32*a* of the tray retrieval mechanism 32 referred to above, the electric motor 40*a* of the rotary head delivery device 40 referred to above, the first camera 50 referred to above, the second camera 70 referred to above, and a data storage unit 104.

The control system also includes the electric motor 62*a* of the head rotating mechanism 62 of the rotary head 60 referred to above, the air cylinders 65*a* of the nozzle lifting and lowering mechanisms 65 of the rotary head 60 referred to above, the electric motors 67*a* of the nozzle rotating mechanisms 67 of the rotary head 60 referred to above, the electric motors 105 for rotating the take-up reels of the carrier tape feed device 80 referred to above, and the solenoids 106 for lifting and lowering the heating units of the cover tape applying device referred to above.

The main controller 101 has a microcomputer, various drivers, various interfaces, and so on, and sends operation signals to the connected devices according to operation control programs stored in a read only memory (ROM). The input unit 102 includes a keyboard, etc. for entering part inserting conditions, to be described later, etc., based on a screen displayed on the display unit 103 after the main controller 101 is activated. The data storage unit 104 stores image data of images captured by the first camera 50 and image data of images captured by the second camera 70, and also stores the entered part inserting conditions, etc.

An example of operation of the taping apparatus illustrated in FIG. 2 will be described below with reference to FIGS. 7, 8A, 8B, 9A, 9B, 10A, 10B, 11A, 11B, 12A, 12B, 13A, 13B, 14A and 14B. The operation to be described below is by way of example only, and should not be taken as limiting the manner in which the taping apparatus illustrated in FIG. 2 operates.

The taping apparatus illustrated in FIG. 2 is designed to handle three kinds of parts C1 through C3. Three kinds of trays 20 that carry the respective different kinds of parts C1 through C3 scattered on the mats 22 are prepared, and are stored in vertical stacks respectively in the three tray storage sections 12 of the tray storage device 10 (see FIG. 2).

The numbers of the parts C1 through C3 scattered on the mats 22 of the trays 20 are not limited to any particular values. However, if the distances between the scattered parts C1 through C3 are too small, then a first image recognizing process, to be described later, and a part sucking process, to be described later, may possibly be disrupted. Therefore, a certain maximum value or upper limit may be set for the number of scattered parts depending on the size of the mats 22. For example, the maximum value may be a multiple (e.g., 80, 160, or 240) of the number (8) of the suction nozzles 66 of the rotary head 60 or a value approximate thereto.

Inasmuch as the taping apparatus illustrated in FIG. 2 is designed to handle three kinds of parts C1 through C3, the supply reel TR1 that carries the carrier tape CT1 wound thereon, the supply reel TR2 that carries the carrier tape CT2 wound thereon, and the supply reel TR3 that carries the carrier tape CT3 wound thereon are prepared, and the supply reels TR1 through TR3 are rotatably installed on the shaft 82. The carrier tapes CT1 through CT3 are drawn from the respective supply reels TR1 through TR3 and placed in the guide grooves 85a through 87a in the tape guides 85 through 87. The ends of the drawn carrier tapes CT1 through CT3 are attached respectively to the take-up reels, not illustrated, by adhesive tapes or the like.

Figure 7:
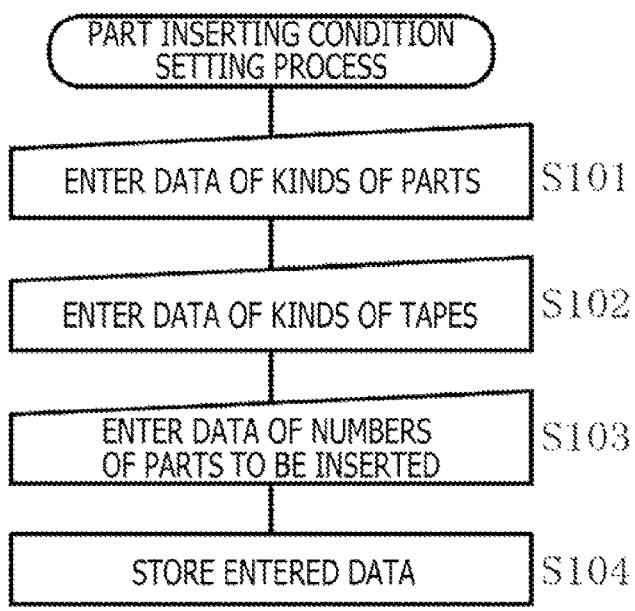
FIG. 7 is a flowchart of a part inserting condition setting process carried out in preparation for operation of the taping apparatus illustrated in FIG. 2.

After the three trays 20 have been stored, the three supply reels TR1 through TR3 have been installed on the shaft 82, and the carrier tapes CT1 through CT3 have been attached to the take-up reels, part inserting conditions are set according to a part inserting condition setting process, which includes steps S101 through S104, illustrated in FIG. 7. Based on a screen displayed on the display unit 103, the operator, using the input unit 102 (see FIG. 6), enters the kinds of parts C1 through C3 in association with the respective tray storage sections 12 of the tray storage device 10 (step S101), enters the kinds of the carrier tapes CT1 through CT3 in association with the supply reels TR1 through TR3 of the carrier tape feed device 80 (step S102), and enters the numbers of parts C1 through C3 to be inserted in the carrier tapes CT1 through CT3 and the order in which to insert the parts C1 through C3 (step S103). The entered data are stored in the data storage unit 104 (step S104).

The step of entering the numbers of parts C1 through C3 to be inserted in the carrier tapes CT1 through CT3 (step S103) will be described in greater detail below. If a take-up reel that carries a part storage tape based on a combination of the parts C1 and the carrier tape CT1 is required to bear a total of 500 parts C1, for example, then the operator enters 500 as the number of parts C1 to be inserted. If a take-up reel that carries a part storage tape based on a combination of the parts C2 and the carrier tape CT2 is required to bear a total of 800 parts C2, for example, then the operator enters 800 as the number of parts C2 to be inserted. If a take-up reel that carries a part storage tape based on a combination of the parts C3 and the carrier tape CT3 is required to bear a total of 1000 parts C3, for example, then the operator enters 1000 as the number of parts C3 to be inserted. When entering the numbers of parts to be inserted, the operator may enter numerical values representing the sums of the numbers of parts to be inserted and extra values that are approximately 5% to 20% of the total numbers of parts to be inserted, in order to avoid a shortage of parts on the part of a user such as a device manufacturer or the like at the time of using part storage tapes.

After completing the setting of the part inserting conditions, the operator enters an operation start command through the input unit 102 (see FIG. 6), causing the taping apparatus illustrated in FIG. 2 to start a sequence of operation for manufacturing part storage tapes.

Figure 8A:
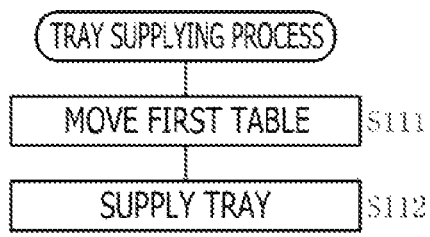
FIG. 8A is a flowchart of a tray supplying process carried out by the taping apparatus illustrated in FIG. 2.
Figure 8B:
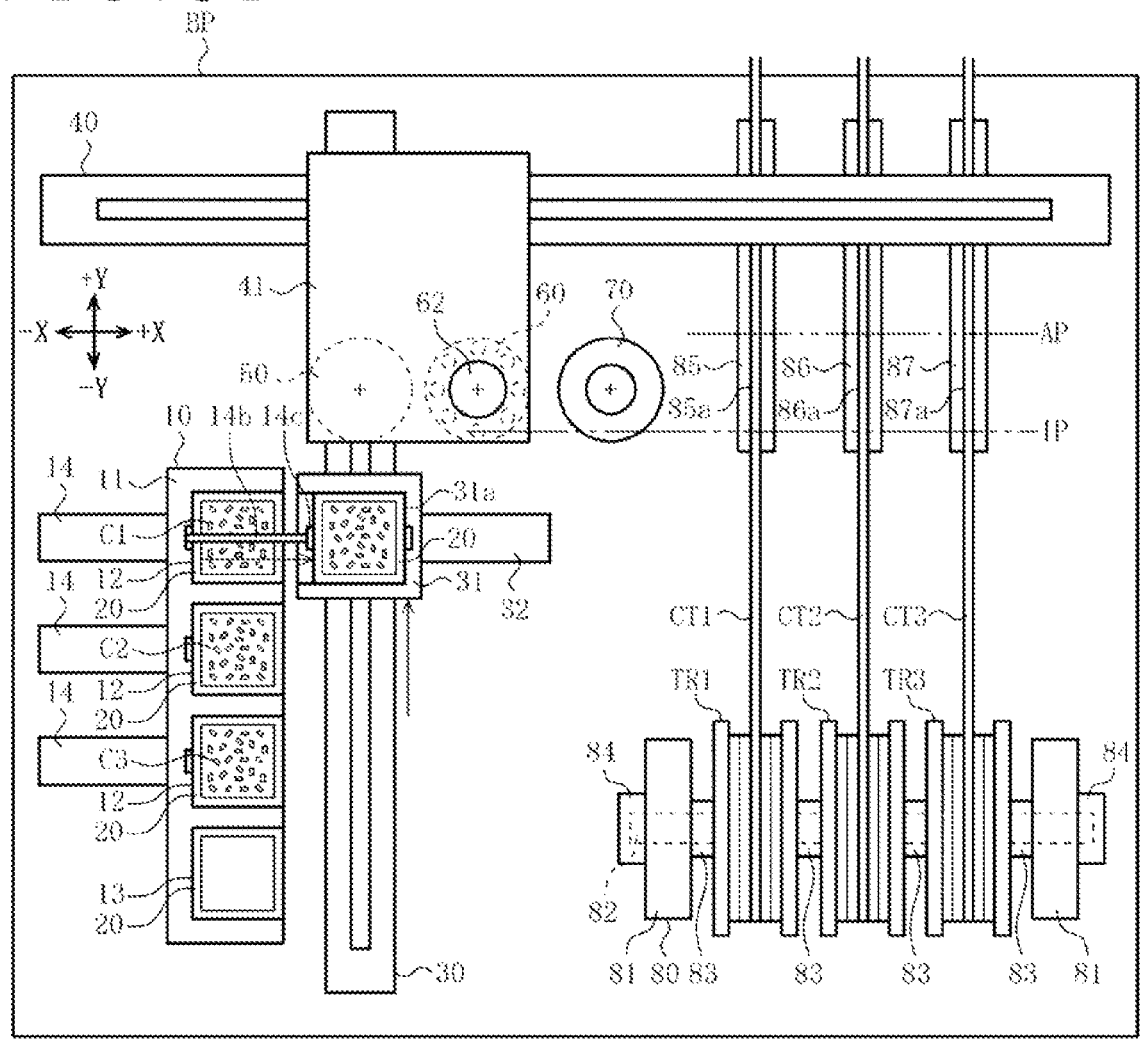
FIG. 8B is a plan view of the taping apparatus illustrated in FIG. 2 as it operates to supply the tray.

If the order in which to insert the parts C1 through C3 indicates that the parts C1 are to be inserted first, the parts C2 second, and the parts C3 third, then the tray 20 designated as a first tray is supplied according to a tray supplying process, which includes steps S111 and S112, illustrated in FIG. 8A. Specifically, as illustrated in FIG. 8B, the first table 31 is moved in the +Y direction by the tray delivery device 30 and stopped at a position facing the tray storage section 12 that stores the trays 20 where the parts C1 are scattered on the mats 22 (step S111). The tray supply mechanism 14 operates to push the uppermost tray 20 in the tray storage section 12 toward the first table 31, and places the uppermost tray 20 on the first table 31 where the tray 20 is received in the tray housing recess 31a (step S112).

Figure 9A:
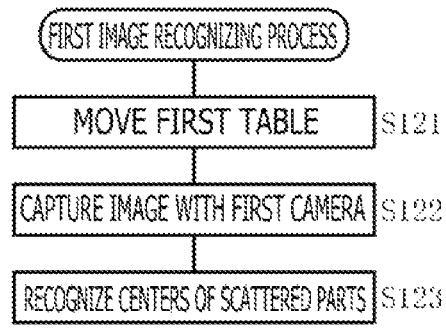
FIG. 9A is a flowchart of a first image recognizing process carried out by the taping apparatus illustrated in FIG. 2.
Figure 9B:
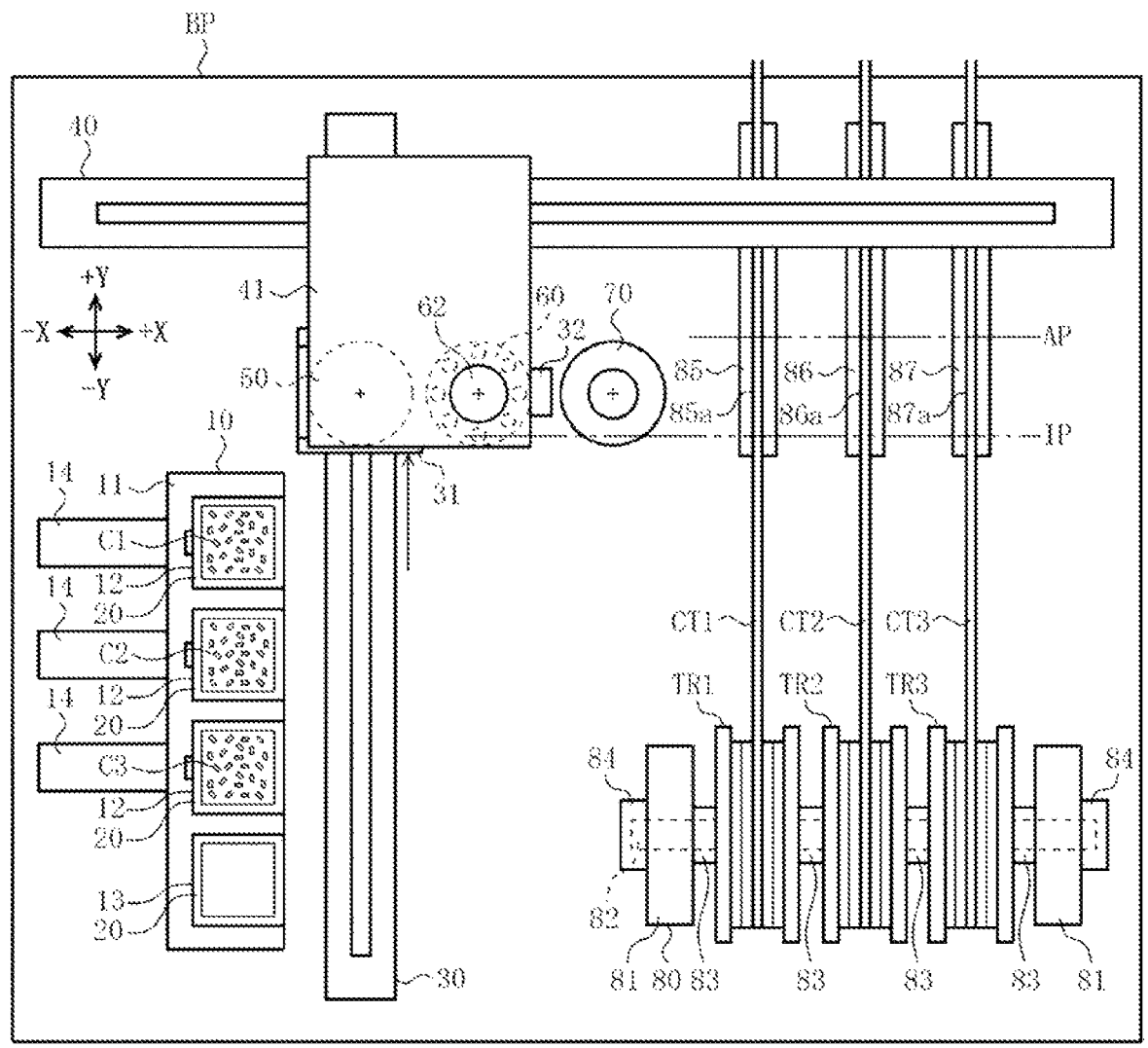
FIG. 9B is a plan view of the taping apparatus illustrated in FIG. 2 as it operates to carry out the first image recognizing process.

Then, a first image recognizing process, which includes steps S121 through S123 illustrated in FIG. 9A, is carried out. Specifically, as illustrated in FIG. 9B, the first table 31 that stores the tray 20 designated as the first tray is moved in the +Y direction by the tray delivery device 30 and stopped at a position below the first camera 50 (step S121). The first camera 50 captures an image of the parts C1 scattered on the mat 22 of the tray 20 (step S122). The centers of the respective parts c1 are recognized based on the image captured by the first camera 50, and are stored (step S123). The centers of the respective parts C1 are recognized according to a pattern detection method or an edge detection method, and the recognized centers are stored as XY coordinates.

Figure 10A:
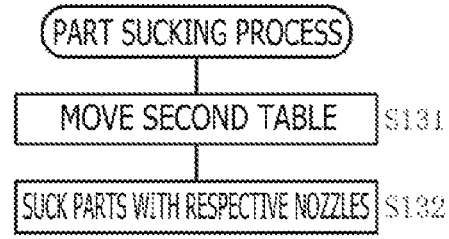
FIG. 10A is a flowchart of a part sucking process carried out by the taping apparatus illustrated in FIG. 2.
Figure 10B:
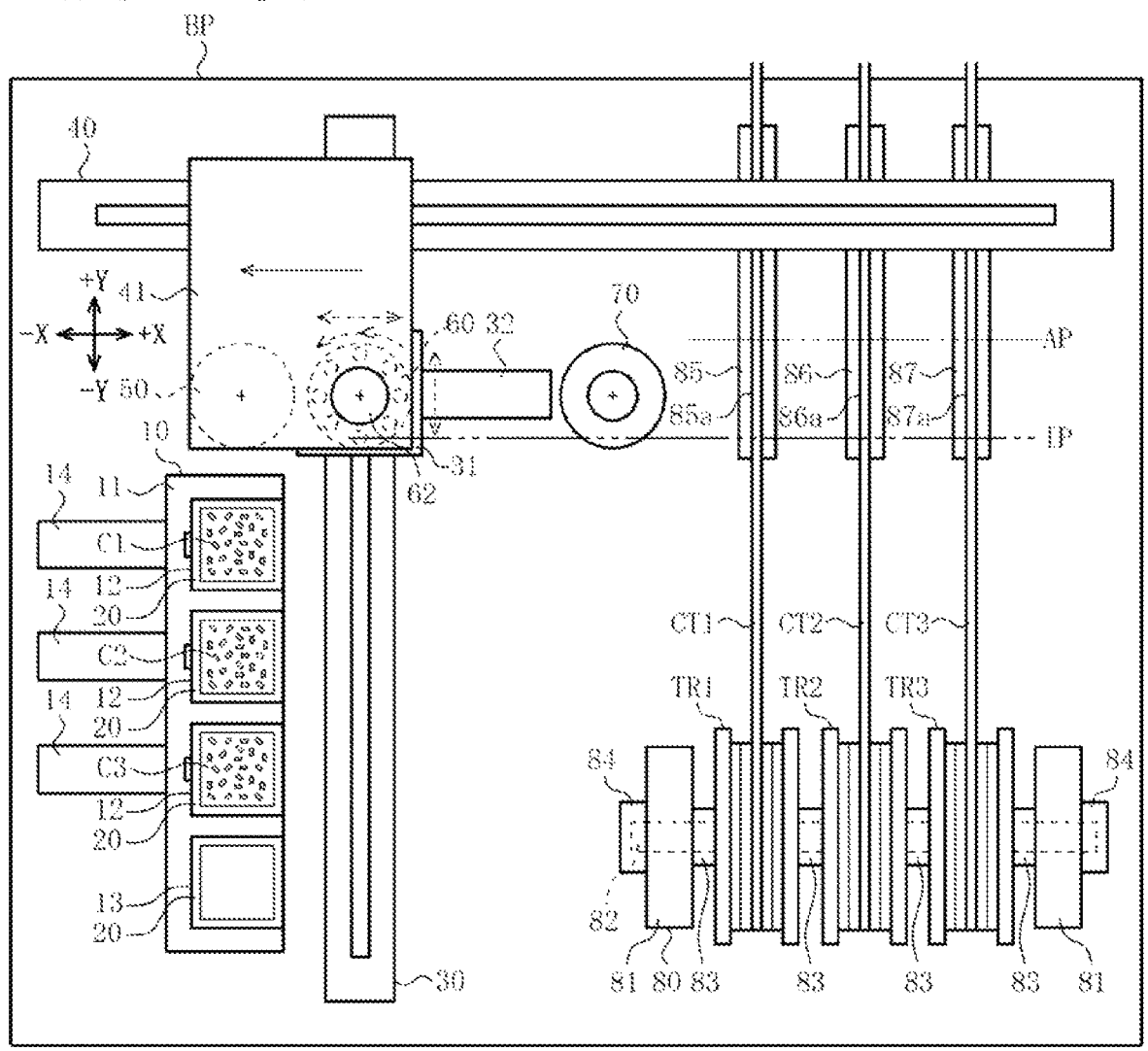
FIG. 10B is a plan view of the taping apparatus illustrated in FIG. 2 as it operates to carry out the part sucking process.

Then, a part sucking process, which includes steps S131 and S132 illustrated in FIG. 10A, is carried out. Specifically, as illustrated in FIG. 10B, the second table 41 is moved in the −X direction by the rotary head delivery device 40 and stopped in a position where the rotary head 60 is positioned above the tray 20 designated as the first tray (step S131). Based on the respective centers or XY coordinates of the recognized scattered parts C1, the scattered parts C1 are sucked by the eight suction nozzles 66 of the rotary head 60 (step S132).

The step of sucking the parts C1 to the eight suction nozzles 66 (step S132) will be described in greater detail below. Each of the parts C1 is sucked to one of the eight suction nozzles 66 that is positioned on the extension of the two-dot-and-dash line that represents the part inserting position IP illustrated in FIG. 5D. Initially, as one of the suction nozzles 66, i.e., a first suction nozzle 66, is positioned on the extension of the two-dot-and-dash line, the first table 31 is moved in the +Y direction or the −Y direction and the second table 41 is moved in the +Y direction or the −Y direction to bring the center of the first suction nozzle 66 into alignment with the center or XY coordinates of a part C1 to be sucked, after which the part C1 is sucked to the first suction nozzle 66. Then, the head body 61 of the rotary head 60 is turned 45° about its vertical central axis to position a next one of the suction nozzles 66, i.e., a second suction nozzle 66, on the extension of the two-dot-and-dash line, and the first table 31 is moved in the +Y direction or the −Y direction and the second table 41 is moved in the +Y direction or the −Y direction to bring the center of the second suction nozzle 66 into alignment with the center or XY coordinates of a next part C1 to be sucked, after which the next part C1 is sucked to the second suction nozzle 66. In this manner, parts C1 are sucked to the eight suction nozzles 66. Each part C1 is sucked to the suction nozzle 66 on the extension of the two-dot-and-dash line by developing a negative pressure in the suction hole in the suction nozzle 66 and lowering the suction nozzle 66 with the nozzle lifting and lowering mechanism 65 until the suction nozzle 66 touches the part C1 on the mat 22, whereupon the part C1 is sucked to the suction nozzle 66 under the negative pressure. After the part C1 has been sucked to the suction nozzle 66, the suction nozzle 66 is lifted back by the nozzle lifting and lowering mechanism 65.

Figure 11A:
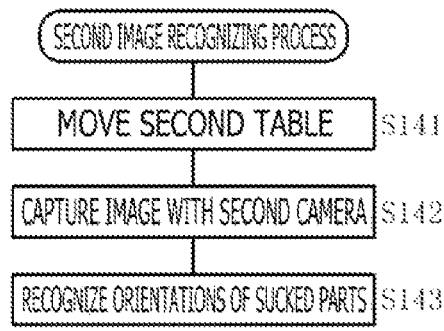
FIG. 11A is a flowchart of a second image recognizing process carried out by the taping apparatus illustrated in FIG. 2.
Figure 11B:
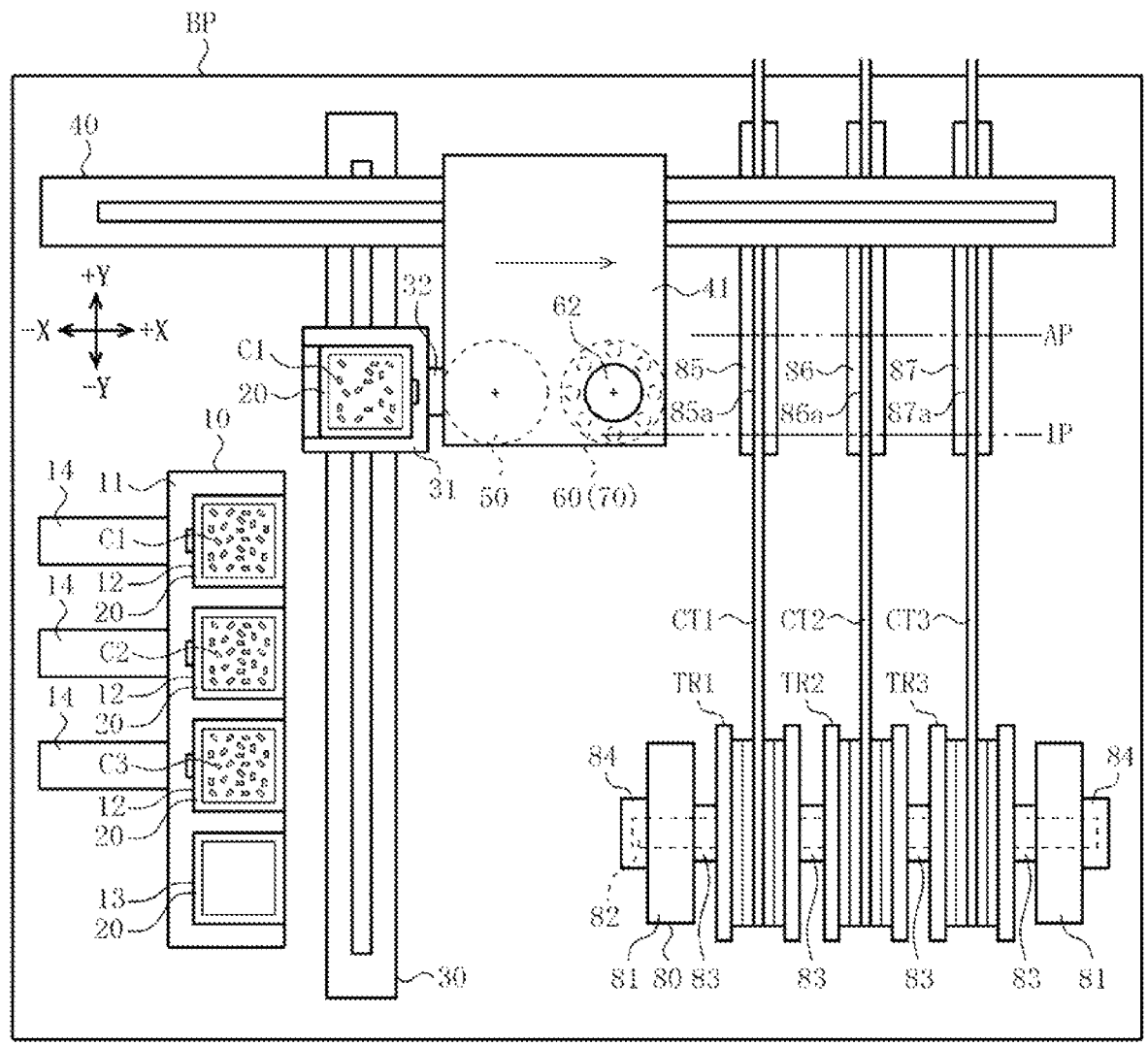
FIG. 11B is a plan view of the taping apparatus illustrated in FIG. 2 as it operates to carry out the second image recognizing process.
Figure 13A:
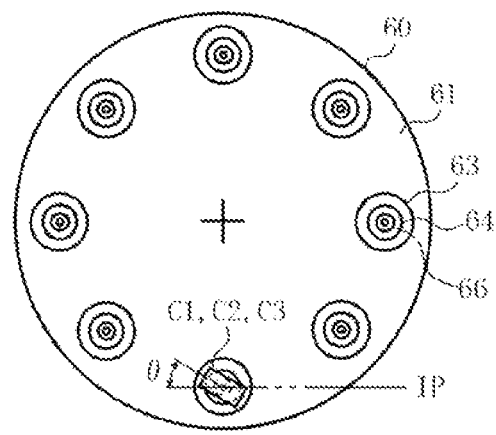
FIG. 13A is a view similar to FIG. 5D, illustrating the manner in which the taping apparatus operates to carry out the second image recognizing process illustrated in FIGS. 11A and 11B.

Then, a second image recognizing process, which includes steps S141 through S143 illustrated in FIG. 11A, is carried out. Specifically, as illustrated in FIG. 11B, after the parts C1 have been sucked to the suction nozzles 66, the second table 41 is moved in the +X direction by the rotary head delivery device 40 and stopped in a position where the rotary head 60 is positioned above the second camera 70 (step S141). Images of all of the parts C1 sucked to the suction nozzles 66 are captured by the second camera 70 (step S142). Based on the images captured by the second camera 70, respective orientations of the parts C1 are recognized and stored (step S143). The orientations of the respective parts C1 are recognized in step S143 according to a pattern detection method or an edge detection method, and each of the recognized orientations is stored as an angle θ with respect to a standard line established in an XY coordinate system, i.e., the extension of the two-dot-and-dash line that represents the part inserting position IP as illustrated in FIG. 13A.

Figure 12A:
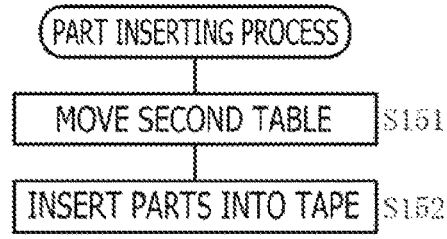
FIG. 12A is a flowchart of a part inserting process carried out by the taping apparatus illustrated in FIG. 2.
Figure 12B:
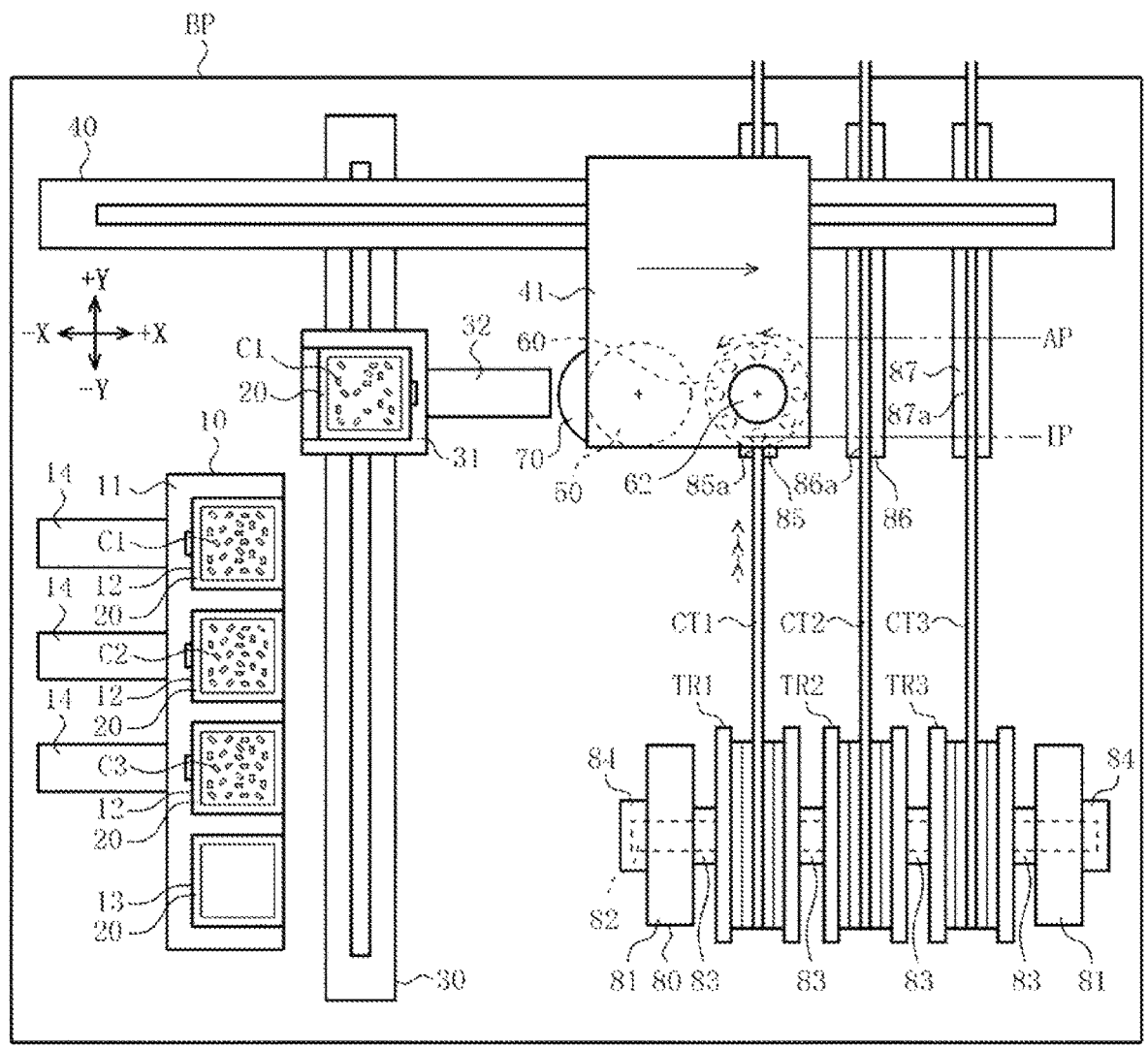
FIG. 12B is a plan view of the taping apparatus illustrated in FIG. 2 as it operates to carry out the part inserting process.

Then, a part inserting process, which includes steps S151 and S152 illustrated in FIG. 12A, is carried out. Specifically, as illustrated in FIG. 12B, the second table 41 is moved in the +X direction by the rotary head delivery device 40 and stopped at a position where the suction nozzle 66 of the rotary head 60 which is positioned on the extension of the two-dot-and-dash line is disposed above a part storage recess CTa in the carrier tape CT1 designated as a first carrier tape (step S151). Based on the orientation, i.e., the angle θ, that has been recognized, the suction nozzle 66 is turned about its own vertical central axis to adjust the orientation of the part C1 so that the part C1 can snugly be inserted into the part storage recess CTa. Then, the part C1 is inserted into the part storage recess CTa (step S152). After the part C1 has been inserted into the part storage recess CTa, the carrier tape CT1 is moved in the +Y direction by a distance commensurate with the pitch Pa between the part storage recesses CTa. Each time the part C1 is inserted into the part storage recess CTa, the carrier tape CT1 is intermittently moved in the +Y direction by distances commensurate with the pitch Pa between the part storage recesses CTa, and the above part inserting step is repeated until the parts C1 on all the eight suction nozzles 66 are inserted into respective part storage recesses CTa.

Figure 13B:
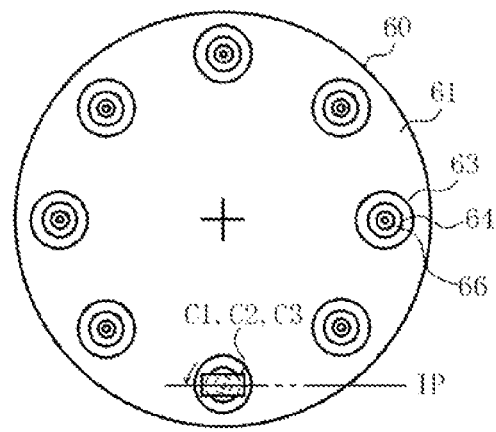
FIG. 13B is a view similar to FIG. 5D, illustrating the manner in which the taping apparatus operates to carry out the part inserting process illustrated in FIGS. 12A and 12B.

The step of inserting the parts C1 from the eight suction nozzles 66 into the respective part storage recesses CTa (step S152) will be described in greater detail below. The parts C1 are inserted into the respective part storage recesses CTa in the part inserting position IP where only one of the suction nozzles 66, i.e., a first suction nozzle 66, is positioned at a time. Initially, as one of the suction nozzles 66, i.e., the first suction nozzle 66, is disposed in the part inserting position IP, if the part C1 sucked to the first suction nozzle 66 is oriented at the angle θ as illustrated in FIG. 13A, then the first suction nozzle 66 is turned by the nozzle rotating mechanism 67 until the angle θ is eliminated, as illustrated in FIG. 13B. Thereafter, the part CT1 on the first suction nozzle 66 is inserted into a corresponding part storage recess CTa in the carrier tape CT1. For inserting the parts C1 from the second and subsequent suction nozzles 66 into respective part storage recesses CTa in the carrier tape CT1, the head body 61 is intermittently turned through 45° to bring the parts C1 into the part inserting position IP. When each of the parts C1 has reached the part inserting position IP, the orientation of the part C1 is calculated based on the orientation or angle θ of the previously recognized part C1, and the suction nozzle 66 is turned by the nozzle rotating mechanism 67 until the calculated orientation is eliminated. The correctly oriented parts C1 are then inserted from the second and subsequent suction nozzles 66 into respective part storage recesses CTa in the carrier tape CT1. The part C1 is inserted from each of the suction nozzles 66 by lowering the suction nozzle 66 in the part inserting position IP with the nozzle lifting and lowering mechanism 65 and applying a positive pressure to the suction hole in the suction nozzle 66 to insert the part C1 into the part storage recess CTa. After the part C1 has been inserted from each of the suction nozzles 66 into the corresponding part storage recess CTa, the suction nozzle 66 is lifted back by the nozzle lifting and lowering mechanism 65.

After the parts C1 have been inserted into all the part storage recess CTa in the carrier tape CT1, a cover tape, not illustrated, is applied to the carrier tape CT1 in the cover tape applying position AP. The carrier tape CT1 with the cover tape applied thereto, i.e., a part storage tape, is wound on a take-up reel, not illustrated.

The part sucking process described above with reference to FIGS. 10A and 10B, the second image recognizing process described above with reference to FIGS. 11A and 11B, and the part inserting process described above with reference to FIGS. 12A and 12B are repeated as many times as the number of parts C1 on the mat 22 of the first tray 20. Actually, since it is difficult to suck all the parts C1 on the mat 22 on account of the accuracy of the first image recognizing process and the accuracy of the part sucking process, the parts inserted into the part storage recesses CTa may be fewer than the parts scattered on the mat 22.

Figure 14A:
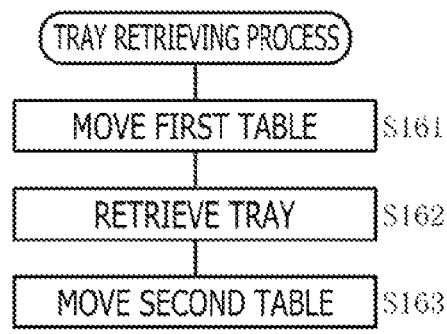
FIG. 14A is a flowchart of a tray retrieving process carried out by the taping apparatus illustrated in FIG. 2.
Figure 14B:
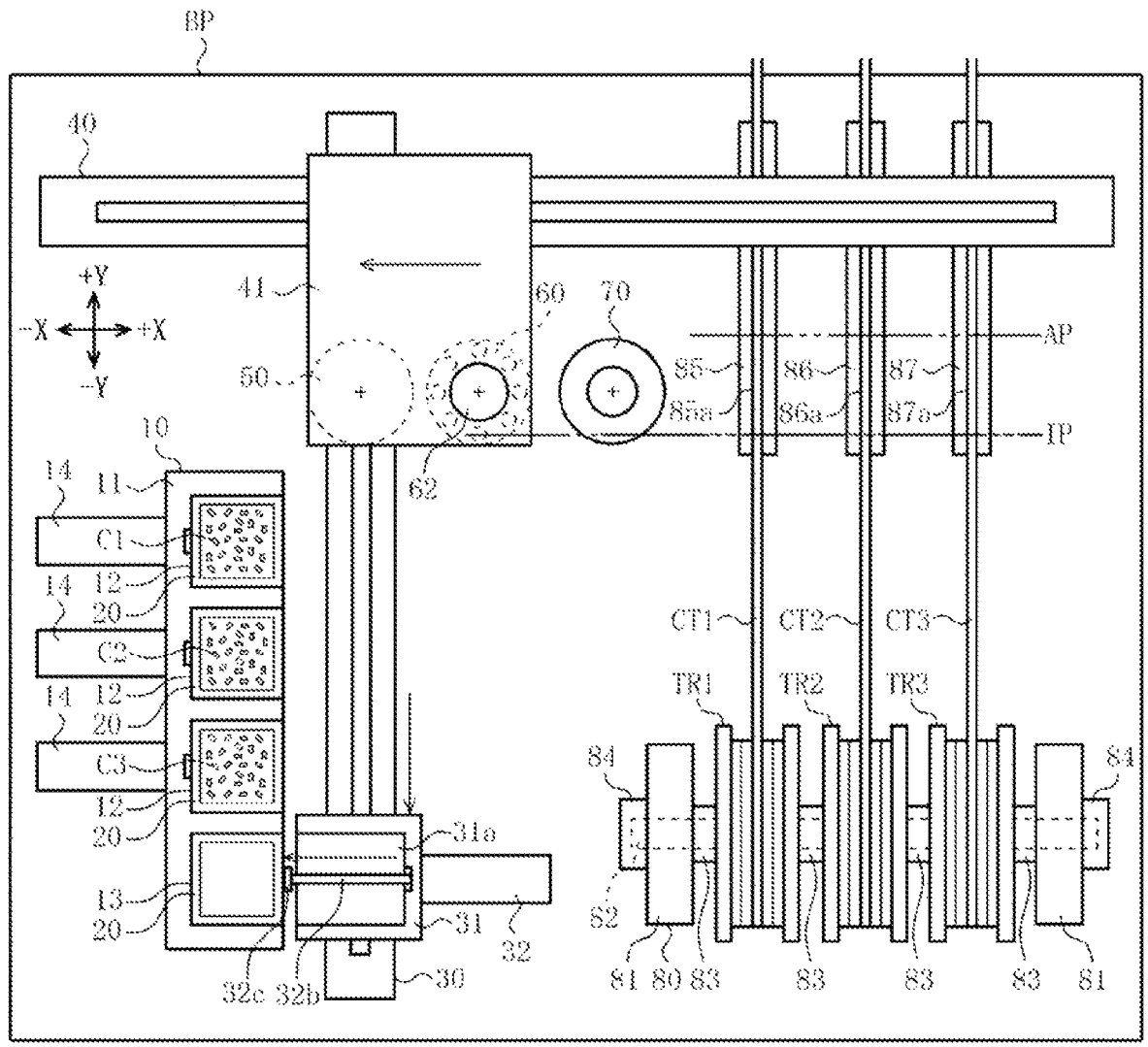
FIG. 14B is a plan view of the taping apparatus illustrated in FIG. 2 as it operates to carry out the tray retrieving process.

After the parts C1 on the first tray 20 have been sucked and inserted, a tray retrieving process, which includes steps S161 through S163 illustrated in FIG. 14A, is carried out. Specifically, as illustrated in FIG. 14B, the first table 31 is moved in the −Y direction by the tray delivery device 30 and stopped in a position where the first table 31 faces the tray retrieval section 13 (step S161). The tray 20 in the tray housing recess 31a in the first table 31 is pushed toward the tray retrieval section 13 by the tray retrieval mechanism 32, and stored in the tray retrieval section 13. Then, the second table 41 is moved back in the −X direction by the rotary head delivery device 40. Thereafter, the tray supplying process described above with reference to FIGS. 8A and 8B and the first image recognizing process described above with reference to FIGS. 9A and 9B are carried out. If it is possible to insert a required number of parts from a single tray 20 into respective part storage recesses in a carrier tape, then the tray supplying process described above with reference to FIGS. 8A and 8B and the first image recognizing process described above with reference to FIGS. 9A and 9B are not carried out.

The insertion of parts C1 designated as first parts into the part storage recesses CTa in the carrier tape CT1 designated as a first carrier tape is completed when the total number of inserted parts C1 has reached a designated number. After the insertion of parts C1 has been completed, the carrier tape CT1 with the cover tape applied thereto, i.e., the part storage tape, is severed, and the take-up reel that carries the part storage tape where the total number of inserted parts is the designated number is removed from the taping apparatus and readied for shipment.

If the order in which to insert the parts C1 through C3 is such that the parts C1 are to be inserted first, the parts C2 are to be inserted second, and the parts C3 are to be inserted third, then the parts C1 designated as first parts are inserted into the part storage recesses CTa in the carrier tape CT1 designated as a first carrier tape, thereafter the parts C2 designated as second parts are inserted into the part storage recesses CTa in the carrier tape CT2 designated as a second carrier tape, and then the parts C3 designated as third parts are inserted into the part storage recesses CTa in the carrier tape CT3 designated as a third carrier tape. If the total number of parts C1 to be inserted is 500, for example, the total number of parts C2 to be inserted is 800, for example, and the total number of parts C3 to be inserted is 1000, for example, then three kinds of single fewer-parts reels, i.e., a total of three reels that store fewer parts, including a take-up reel carrying a total of 500 parts C1, a take-up reel carrying a total of 800 parts C2, and a take-up reel carrying a total of 1000 parts C3 are successively manufactured by the single taping apparatus.

Since the order in which to insert the parts C1 through C3 can be set to any desired order, the order may be such that the parts C1 are to be inserted first, the parts C2 are to be inserted second, the parts C3 are to be inserted third, the parts C1 are to be inserted fourth, the parts C2 are to be inserted fifth, and the parts C3 are to be inserted sixth, so that three kinds of two fewer-parts reels, i.e., a total of six reels that store fewer parts (two reels of one kind, two reels of one kind, and two reels of one kind), can be successively manufactured by the single taping apparatus. Alternatively, the order may be such that the parts C1 are to be inserted first, the parts C2 are to be inserted second, the parts C3 are to be inserted third, the parts C1 are to be inserted fourth, and the parts C3 are to be inserted fifth, so that three kinds of fewer-parts reels, i.e., a total of five reels that store fewer parts (two reels of one kind, one reel of one kind, and two reels of one kind), can be successively manufactured by the single taping apparatus. Furthermore, the order may be such that the parts C1 are to be inserted first, the parts C2 are to be inserted second, the parts C1 are to be inserted third, and the parts C2 are to be inserted fourth, so that two kinds of two fewer-parts reels, i.e., a total of four reels that store fewer parts (two reels of one kind and two reels of one kind), can be successively manufactured by the single taping apparatus.

Modifications of the taping apparatus will be described below.

<Modification 1>

FIG. 2 illustrates the taping apparatus that handles the three kinds of parts C1 through C3 and the three kinds of carrier tapes CT1 through CT3 into which the respective kinds of parts C1 through C3 can be inserted. However, a taping apparatus may be designed to handle four or more kinds of parts and as many kinds of carrier tapes into which the respective kinds of parts can be inserted, or specifically a taping apparatus may incorporate more kinds of trays 20, a tray storage device 10 with more tray storage sections 12, and a carrier tape feed device 80 with more supply reels, so that four or more kinds of fewer-parts reels, i.e., reels that store fewer parts, can be manufactured by the single taping apparatus by appropriately setting the order in which to insert the parts.

<Modification 2>

FIGS. 2 and, 5A, 5B, 5C and 5D illustrate the rotary head 60 having the eight suction nozzles 66 that can be lifted and lowered and can be rotated about their own axes. However, the number of suction nozzles 66 can be increased or reduced depending on the size of the head body 61. If the number of suction nozzles 66 of the rotary head 60 is nine or more, then the number of parts that can be inserted by the single rotary head 60 is increased to reduce the period of time that is required to manufacture each fewer-parts reel.

<Modification 3>

FIG. 2 illustrates the taping apparatus in which the first camera 50 is mounted on the second table 41. However, the rotary head 60 may be disposed in the position of the first camera 50 on the second table 41, and the first camera 50 may be fixedly disposed above the rotary head 60 out of contact with the second table 41. According to such a modification, the second table 41 may be temporarily moved in the −X direction or the +X direction in the first image recognizing process described above with reference to FIGS. 9A and 9B.

<Modification 4>

Figure 15A:
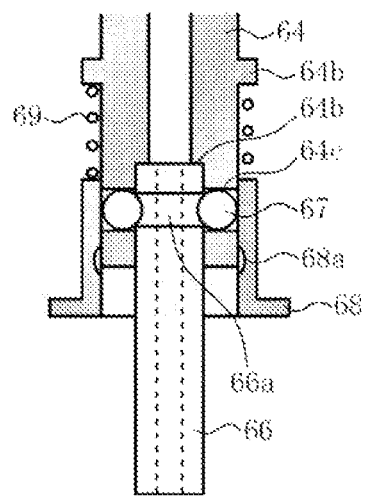
FIGS. 15A and 15B are enlarged fragmentary cross-sectional views of a modification of a nozzle support and a suction nozzle illustrated in FIG. 5C.

FIGS. 5A, 5B, 5C and 5D illustrate the suction nozzles 66 that are integrally combined with the respective nozzle supports 64. However, if it is difficult to use common nozzles as the suction nozzles 66 owing to the kinds of parts to be inserted, then the suction nozzles 66 may be removably mounted on the nozzle supports 64. For example, as illustrated in FIG. 15A, a nozzle support 64 has a nozzle insertion hole 64c defined axially in a lower end portion thereof and a plurality of ball receiving grooves 64d defined radially in the lower end portion thereof. The nozzle support 64 may also have a spring retainer 64e protruding radially outwardly from an outer circumferential surface thereof. A helical compression spring 64f is disposed around the nozzle support 64 and extends axially between the spring retainer 64e and an unlocking tube 68 axially slidably fitted over the lower end portion of the nozzle support 64 and retained on the nozzle support 64 against removal therefrom. Locking balls 67 are radially movably disposed in the respective ball receiving grooves 64d. The unlocking tube 68 has an annular ball retracting slot 68a defined in an inner circumferential surface thereof. A suction nozzle 66 has an annular ball locking slot 66a defined in an outer circumferential surface thereof near an upper end thereof. When the unlocking tube 68 is in a lower position under the bias of the compression spring 64f, its inner circumferential surface displaces the locking balls 67 radially inwardly, keeping the locking balls 67 partly in the annular ball locking slot 66a in the suction nozzle 66. Therefore, the suction nozzle 66 is locked in the nozzle insertion hole 64c in the nozzle support 64 by the locking balls 67, as illustrated in FIG. 15A. When the unlocking tube 68 is pushed upwardly against the bias of the compression spring 64f until the locking balls 67 are displayed radially outwardly and partly received in the annular ball retracting slot 68a, as indicated by the arrows in FIG. 15B, the suction nozzle 66 can be pulled out of the nozzle insertion hole 64c in the nozzle support 64.

Figure 15B:
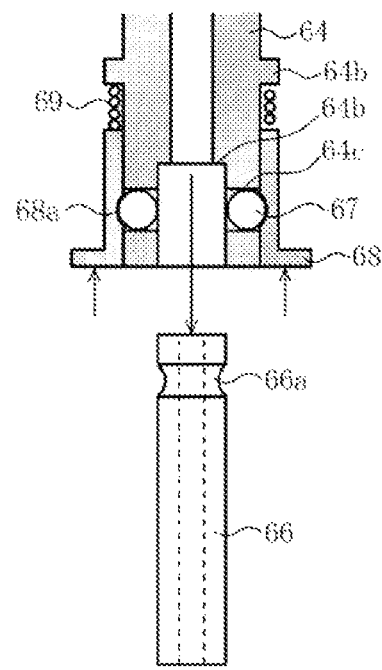

If each of the nozzle supports 64 is constructed to allow a suction nozzle 66 to be removably mounted thereon, as illustrated in FIGS. 15A and 15B, then the taping apparatus may include a vertically movable nozzle retrieval device, not illustrated, having nozzle receiving holes for retrieving the suction nozzles 66 from the rotary head 60 and a vertically movable nozzle supply device, not illustrated, for supplying suction nozzles 66 to the rotary head 60. The nozzle retrieval device and the nozzle supply device may be disposed in a range in which the second table 41 is movable and below the rotary head 60. When the rotary head 60 is moved to a position above the nozzle retrieval device, the nozzle retrieval device is lifted and pulls all the suction nozzles 66 from the respective nozzle insertion holes 64c in the nozzle supports 64. When the rotary head 60 is then moved to a position above the nozzle supply device, the nozzle supply device is lifted and inserts other suction nozzles into the respective nozzle insertion holes 64c in all the nozzle supports 64. In other words, the nozzle retrieval device and the nozzle supply device may automatically replace all the suction nozzles 66 on the rotary head 60 with other suction nozzles.

The present disclosure contains subject matter related to that disclosed in Japanese Priority Patent Application JP 2018-117602 filed in the Japan Patent Office on Jun. 21, 2018, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A taping method comprising:
   supplying a designated one of a plurality of kinds of trays on which respective different kinds of parts are scattered, using a tray storage device;
   capturing an image of the scattered parts on the designated tray supplied by the tray storage device, using a first camera;
   recognizing respective centers of the scattered parts based on the image thereof captured by the first camera, using a first image recognizing device;
   individually sucking the scattered parts to a plurality of rotatable suction nozzles based on the respective centers of the scattered parts recognized by the first image recognizing device, using a rotary head comprising the plurality of suction nozzles;
   capturing an image of the parts sucked to the plurality of suction nozzles of the rotary head, using a second camera;
   recognizing respective orientations of the sucked parts based on the image thereof captured by the second camera, using a second image recognizing device;
   intermittently moving a designated one of a plurality of kinds of carrier tapes which correspond to the respective different kinds of parts, using a carrier tape feed device; and
   adjusting the orientations of the sucked parts to orientations insertable into part storage recesses defined in the designated carrier tape by rotating the plurality of suction nozzles, based on the respective orientations of the sucked parts recognized by the second image recognizing device, and then inserting the parts into the part storage recesses, respectively, using a part inserting device.

2. The taping method according to claim 1, further comprising:
   receiving the designated tray supplied by the tray storage device on a first table and delivering the first table in a Y direction, using a tray delivery device.

3. The taping method according to claim 2, further comprising:
   delivering a second table, with the rotary head mounted thereon, in an X direction, using a rotary head delivery device.

4. The taping method according to claim 1, wherein the respective centers of the scattered parts recognized by the first image recognizing device are represented by XY coordinates.

5. The taping method according to claim 1, wherein the respective orientations of the sucked parts recognized by the second image recognizing device are represented by angles with respect to a standard line established in an XY coordinate system.

* * * * *